Dec. 24, 1957    R. J. FRANCOEUR    2,817,735
MULTI-POSITION SELECTOR SWITCH
Filed March 13, 1956    3 Sheets-Sheet 1

INVENTOR.
ROBERT J. FRANCOEUR
BY George Sipkin
Lee I. Huntzberger
ATTORNEYS

Dec. 24, 1957   R. J. FRANCOEUR   2,817,735
MULTI-POSITION SELECTOR SWITCH
Filed March 13, 1956   3 Sheets-Sheet 2

INVENTOR.
ROBERT J. FRANCOEUR
BY George Sipkin
Lee D. Huntzberger
ATTORNEYS

Dec. 24, 1957    R. J. FRANCOEUR    2,817,735
MULTI-POSITION SELECTOR SWITCH
Filed March 13, 1956    3 Sheets-Sheet 3

INVENTOR.
ROBERT J. FRANCOEUR
BY George Sipkin
Lee I. Huntzberger
ATTORNEYS

United States Patent Office 2,817,735
Patented Dec. 24, 1957

2,817,735

MULTI-POSITION SELECTOR SWITCH

Robert J. Francoeur, Groton, Conn.

Application March 13, 1956, Serial No. 571,354

11 Claims. (Cl. 200—152)

(Granted under Title 35, U. S. Code (1952), sec. 266)

The invention described herein may be manufactured and used by or for the Government of the United States of America for governmental purposes without the payment of any royalties thereon or therefor.

This invention relates to selector switches and more particularly to a multi-position and multi-pole selector switch having a low and constant contact resistance.

The well-known multi-position type mercury switch which is in wide use at the present time essentially consists of a female receptacle containing mercury, a male plug for insertion into this receptacle, and an insulated base upon which the switch components are mounted. Switches of this type are particularly widely used in strain gage measurements. Strain gage measurements present the requirement for means for switching selectively, a multiplicity of strain gages in and out of an indicating circuit, the indicating circuit generally including a bridge arrangement such as a Wheatstone bridge balance and an indicating meter. Frequently, several hundreds of such strain gages are to be metered in a given test.

The presently used method, utilizing a known-type switch, of accomplishing a strain gage test has been found to be crude and quite inadequate. In order to switch from one strain gage to another, it is necessary under this method to use the jack and plug arrangement. The disadvantages of such an arrangement are manifold. For example, mercury spillage is excessive. Such spilled mercury readily vaporizes at ambient temperatures, creating a health hazard. The plug and jack method of switching contributes to mercury spillage, requiring refilling of the female receptacle, a time consuming and costly process. Moreover, the procedure is awkward and ill-adapted to this type of strain gage measurements. Also, the exposed poles of the jack tend to oxidize in the open atmosphere and, being unguarded, are subject to frequent bending and physical damage.

The rotary type switches with silver-plated contacts are also commonly used to select and connect strain gages into the measuring circuit. The use of these switches also present disadvantages. For example, the silver-plating wears off after constant use resulting in a variation of contact resistance. This variation in contact resistance introduces an intolerable error in the measuring circuit. Also, it is necessary to gang such switches to obtain multi-positions.

It is, accordingly, an object of the present invention, to provide a multi-position type switch which is characterized by low and constant contact resistance.

It is a further object to provide a mercury multi-position type switch which provides low and constant contact resistance and is of vapor-proof construction.

It is another object to provide a switch as set forth in the preceding objects wherein there is ease and selection of switch positions.

It is still another object to provide a switch which provides a multiplicity of switching positions in a compact assembly which is lightweight and portable.

It is still another object to provide a mercury type multi-position switch which is safe to use in confined areas thus eliminating any health hazards wherein the mercury wells are readily and easily filled.

Generally speaking, the present invention provides a multi-position selector switch comprising an enclosed housing. Means are included within said housing for positioning a plurality of electrical contacts in spaced arrangement and in a plurality of arcuate arrays. Discrete corresponding contacts from each of the arrays are radially aligned to permit simultaneous connection to leads from a utilization circuit. A radially disposed member is provided which has one end pivotally mounted substantially at the center with respect to the arcuate arrays, the other end of the member having a plurality of linearly disposed wells adapted to receive a set of corresponding radially aligned contacts. Means are provided for moving the member to selectively insert one set of contacts into the wells.

Other objects and many of the attendant advantages of this invention will be readily appreciated as the same becomes better understood by reference to the following detailed description when considered in connection with the accompanying drawings wherein.

Figure 1:
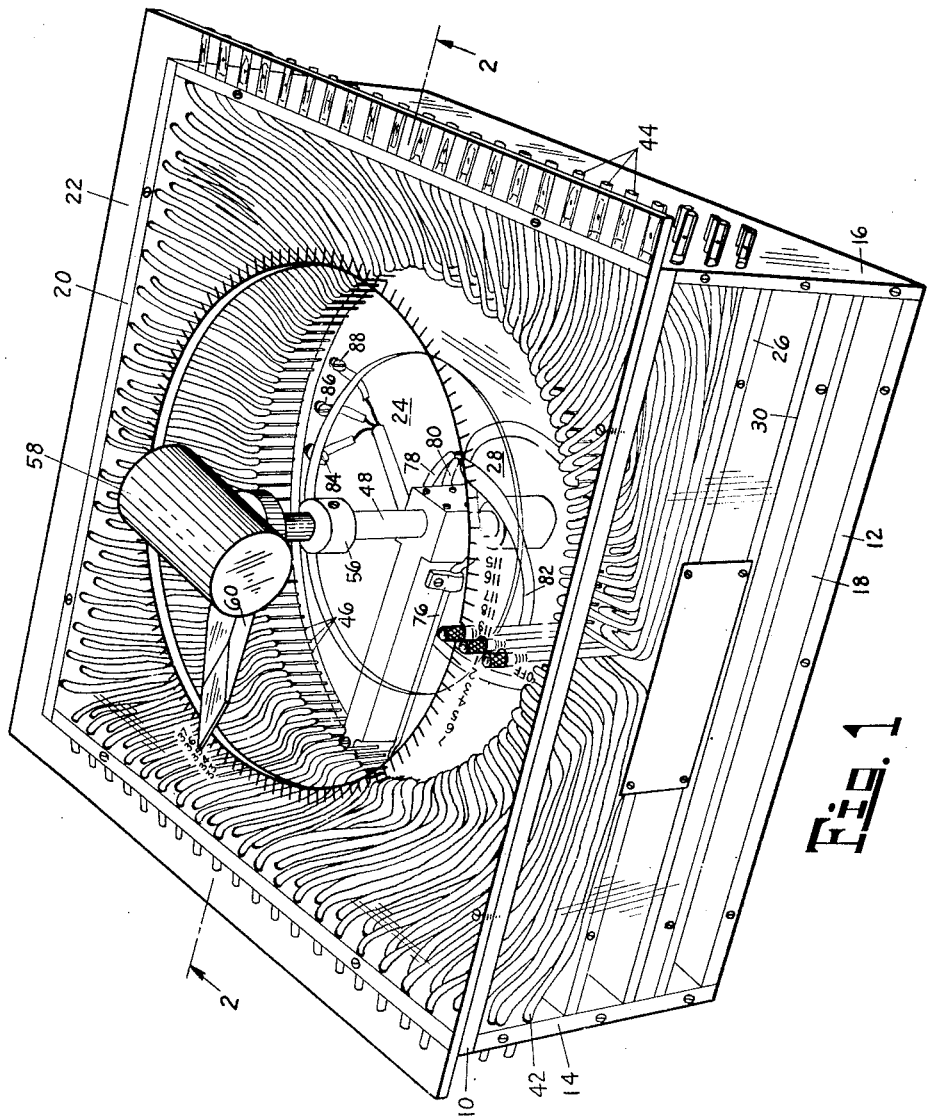
Fig. 1 is a three dimensional view of a preferred embodiment of the invention.
Figure 2:
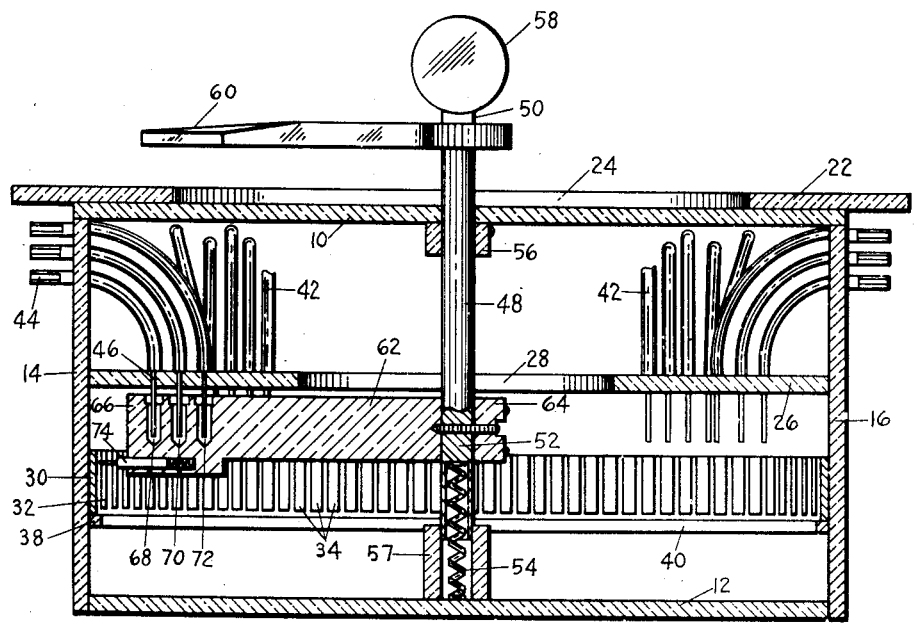
Fig. 2 is a section taken along line 2—2 of Fig. 1.

Referring now to Figs. 1 and 2, there is shown a housing which comprises top and bottom walls 10 and 12 and side walls 14, 16, 18, and 20. The housing is preferably constructed of transparent material such as glass or a transparent plastic. The transparent plastic may suitably be fabricated from a methyl methacrylate resin such as those known by the trade names "Lucite" and "Plexiglas." Although in the embodiments of Figs. 1 and 2, the housing is shown in its horizontal aspect to be of substantially square configuration, it is obvious that it may be of any other suitable outline, such as circular, polygonal, or irregular. Juxtaposed with top wall 10, is a transparent plate 22 which may consist of the same material such as that comprising the walls of the housing. Plate 22 has a circular cut-out portion 24, about the periphery of which there is a circular array of engraved lines radially disposed and numbered in consecutively increasing order. The significance of these engraved lines will be explained hereinbelow. Of course, the walls comprising the housing are fastened together by suitable bolts and screws to provide a substantially firm, rigid structure.

Positioned substantially horizontally within the housing intermediate walls 10 and 12 is a plate 26 also consisting of a suitable transparent material. Plate 26 has an outer configuration coincident with the inner horizontal periphery of the housing. Within plate 26 there is a circular cut-out portion 28. Disposed laterally from the periphery of cut-out portion 28 are three spaced concentric circular arrays of spaced holes passing through plate 26, each circle containing an amount of holes equal in number to the engraved lines at the periphery of the cut-out portion 24 of plate 22 and substantially in vertical registration therewith. The holes are so arranged in the circular arrays that a corresponding hole in each circle forms a linear radially disposed arrangement of three holes.

Positioned substantially horizontally intermediate plate 26 and bottom wall 12 is a relatively thick plate 30 consisting of a substantially rigid material such as aluminum. Plate 30 also has an outer configuration coincident with the inner horizontal periphery of the housing and also contains a circular cut-out portion 32 which is at least greater in diameter than the outer circular array of the holes in plate 26. Disposed vertically along the thickness dimension of cut-out portion 32 of plate 30 is a circular array of slots designated generally as 34 and equal in number to the engraved lines on plate 22 and the radial lines of holes on plate 26. In intimate contact with the bottom of base of plate 30 is a plate 38 which may also consist of aluminum. Plate 38 also has an outer configuration coincident with the inner horizontal periphery of the housing and has a cut-out portion 40, the diameter of which is substantially equal to the diameter of the cut-out portion 32 of plate 30.

Near the upper edge of side walls 14 and 16, there are provided three horizontal parallel spaced rows of spaced holes therethrough for permitting egress from the housing of one end portion of a multiplicity of electrical cable contacts 42 positioned therewithin. For convenience, corresponding holes from each row may form a linear vertical arrangement but this is not strictly necessary as the arrangement of the electrical contacts 42 within the housing is controlling. The insulation stripped end portions 44 of electrical contacts 42 extend through these holes and the other end portions of electrical contacts 42 extend through the concentric arrays of holes in plate 26, the contacts being so positioned in the housing that the end portions 46 of a set of contacts, i. e., 2 or 3 leads as the case may be, are positioned in linear spaced arrangement along a radius within the space between bottom wall 12 and plate 26. Within this space, all the ends of the electrical contacts are substantially in a common horizontal plane. As is seen, end portions 46 of each respective wire also have no electrical insulation thereon so that electrical contact may be made for each end portion.

Extending through top wall 10, substantially at its geometric center is a cylindrical vertical rod 48 having ends 50 and 52 and which may consist of a substantially rigid material such as aluminum. Rod 48 may be of such a length preferably as to normally extend vertically about one-third of its length above top wall 10 and about two-thirds of its length into the interior of the housing. Interposed between the end 52 of rod 48 and the inner surface of bottom wall 12 is a spring 54 suitably enclosed in a boss 57. In intimate contact with the inner surface of top wall 10 and engirdling rod 48 at that point is a stop 56 which may also consist of a suitable plastic material. Affixed to end 50 of rod 48 is a knob 58 consisting of a suitable plastic which may be utilized by the operator of the device for actuating rod 48 in a vertical direction against spring 54. Horizontally positioned directly under knob 58 and without the housing is a pointer 60 substantially as shown which may also consist of a suitable plastic, pointer 60 being adapted to be used in conjunction with the scale on the periphery of the cut-out portion 24 in plate 22.

Affixed to rod 48 within the housing is a horizontally disposed arm 62 having end portions 64 and 66 and which may suitably be of a parallelepiped configuration. The affixation of arm 62 to rod 48 at its end portion 64 is suitably effected by providing a vertical cylindrical hole in end portion 64 thereof wherein rod 48 is received and by suitable pins and screws. It is to be seen that arm 62 is substantially radially disposed. Located at end portion 66 of arm 62 is a linear spaced arrangement of vertical wells 68, 70 and 72 for containing mercury, the spacing of the wells being the same as the spacing of each linear arrangement of corresponding end portions of electrical contacts 42. Suitable covers may be provided for the wells so that the openings thereinto may be sufficiently large to receive the end portions of contacts 42 and yet serve as a caution against any possible spillage of mercury therefrom. At the bottom surface of arm 62 extending from end portion 66, there is provided a spring-loaded follower pin 74, the function of which will be set forth in the description of the operation of the device. Extending from the interior of wells 68, 70 and 72, are the stripped ends of 3 insulated wires 76, 78 and 80, which are positioned along arm 62. Wires 76, 78 and 80, after extending from end portion 64 are carried in a common sleeve 82 through a portion of the length thereof and then each of these wires is attached to respective separate terminal lugs 84, 86 and 88.

Figure 3:
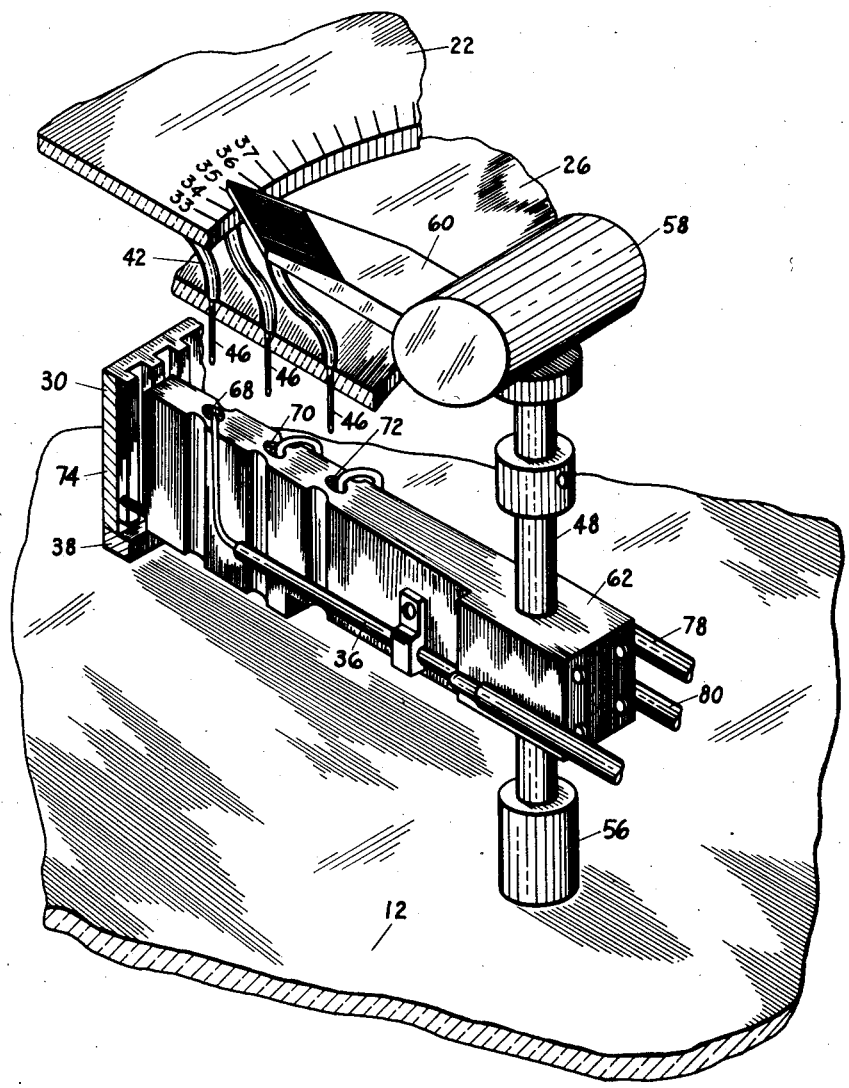
Fig. 3 is a three dimensional view of the movable arm and of the vertical slot and groove structure incorporated in the embodiment of Fig. 1.

In Fig. 3, there is shown the arrangement of wires 76, 78 and 80 extending from end portion 64 of arm 62 and having their respective stripped ends insterted into mercury wells 68 and 70 and 72. There is also shown the cooperative arrangement of plate 30 having the circumferential array of vertical slots and plate 38 with cut-out portion of plate 38 having a circumference coincident with the cut-out portion of plate 30.

Considering the operation of the present invention, assuming the device to be in the off position, knob 58 is grasped to depress rod 48, permitting the follower pin 74 in arm 62 to ride down. The arm is depressed until pin 74 can freely ride in a circumferential path. Knob 58 is now rotated until pointer 60 indicates the desired switching position as indicated by the dial numbers next to the engraved lines on the periphery of cut-out portion 24. Once the correct position is found, follower pin 74 is permitted to rise slowly in a corresponding vertical slot by gradually releasing pressure on knob 58. This permits the spring-loaded rod 48 to rise so that the mercury wells may receive a linear arrangement of corresponding end portions 46 of electrical contacts 42. Thus electrical connection is made between the circuit to which the electrical contacts 42 are connected and those to which wires 76, 78 and 80 are connected. It is to be realized that the connection of wires 76, 78, and 80 to a utilization circuit can be made by any conventional means, not shown, such as the conventional three prong outlet plug etc.

It is to be seen that the present invention is a true type of mechanical switching device as distinguished from the plug and jack means of closing, breaking and changing electrical circuit connetcions. It is more rapidly operable and introduces a much higher degree of precision in the switching functions for which it is designed. The design assures instant and proper alignment of the switching members involved which greatly facilitates this selection of switch positions.

It is readily to be seen that the present invention provides many advantages, among these are low and constant contact resistance, vapor-proof construction features, ease of selection of switch positions, compact assembly for a multiplicity of switching positions, lightness of weight and portability, the presence of safety features which permit the use of the switch in confined areas thus eliminating health hazards, and ease in filling of mercury wells.

Obviously many modifications and variations of the present invention are possible in the light of the above teachings. It is therefore to be understood that within the scope of the appended claims the invention may be practiced otherwise than as specifically described.

I claim:

1. A multi-position selector switch comprising an enclosed housing including upper and lower walls, a first horizontally disposed member intermediate said lower and upper walls having a plurality of spaced concentric arcuate arrays of spaced holes therethrough, corresponding holes in each of said arrays being in spaced linear arrangement, a plurality of electrical contacts positioned within said housing, one end of each of said contacts extending through said holes whereby the ends of the wires passing through each linear arrangement of holes forms a corresponding linear arrangement of spaced electrical contact ends, a radially disposed second member having one end pivotally mounted substantially at the center with respect to said concentric array of holes, the other end of said second member having a plurality of linearly spaced wells for containing mercury and adapted to receive a linear arrangement of electrical contact ends, and means for moving said second member to selectively simultaneously insert said corresponding ends into said wells.

2. A multi-position selector switch comprising an enclosed housing including upper, lower, and side walls, said side walls including a plurality of holes therethrough, a first horizontally disposed member intermediate said upper and lower walls having a plurality of spaced concentric arcuate arrays of spaced holes therethrough, corresponding holes in each of said arrays being in spaced linear arrangements, a plurality of electrical contacts disposed within said housing, one end portion of said electrical contacts extending through said side walls to a point outside said housing, the opposite end portions of said contacts extending through said holes in said first member whereby the end portion of said contacts passing through each linear arrangement of said holes in said first member forms a corresponding linear arrangement of spaced contact ends, a second radially disposed member having one end pivotally mounted in said housing at the center with respect to said concentric arrays of holes, the other end of said second member being adapted to sweep an arcuate path, said other end of said member having a plurality of linearly spaced wells for containing mercury and adapted to receive a linear arrangement of contact ends, and means for moving said second member to selectively simultaneously insert said corresponding contacts into said wells.

3. A multi-position selector switch comprising an enclosed housing including upper, lower, and side walls, said side walls including a plurality of holes therethrough, a horizontally disposed first member intermediate said upper and lower walls having a plurality of spaced concentric arcuate arrays of spaced holes therethrough, corresponding holes in each of said arrays being in spaced linear arrangement, a plurality of electrical contacts disposed within said housing, one end portion of said contacts extending through said side walls to a point outside said housing, the opposite end portions of said contacts extending through said holes in said first member whereby the end portions of said wires passing through each linear arrangement of said holes in said first member forms a corresponding linear arrangement of spaced contact ends, a second radially disposed member having one end pivotally mounted in said housing at the center with respect to said concentric arrays of holes, the other end of said second member being adapted to sweep an arcuate path, said other end of said member having a plurality of linearly spaced walls for containing mercury and adapted to receive the linear arrangement of contact ends, and a vertical rod extending into said housing and affixed to said pivotally mounted end of said second member, and tensioning means normally urging said rod in an upward direction whereby the vertical depression of said rod causes a depression of said second member.

4. A multi-position selector switch comprising an enclosed housing including upper, lower, and side walls, said side walls including a plurality of holes therethrough, a first horizontally disposed member intermediate said upper and lower walls and having a plurality of spaced concentric arcuate arrays of spaced holes therethrough, corresponding holes in each of said arrays being in spaced linear arrangement, a second horizontally disposed member intermediate said first member and said bottom wall, said second member having a substantially circular cut-out portion, a circular array of vertical slots in the peripheral thickness of said cut-out portion, a plurality of electrical contacts disposed within said housing, one end portion of said contacts extending through said side walls to a point outside said housing, the opposite end portions of said contacts extending through said holes in said first member whereby the end portions of said contacts passing through each linear arrangement of said holes in said first member forms a corresponding linear arrangement of spaced contact ends, a third radially disposed member having one end pivotally mounted in said housing at the center with respect to said concentric array of holes, the other end of said third member being adapted to sweep an arcuate path, said other end of said member having a plurality of linearly spaced wells for containing mercury and adapted to receive a linear arrangement of contact ends within said wells, a follower pin extending from said other end of said third member and adapted to ride in one of said vertical slots, a vertical rod extending into said housing and affixed to said pivotally mounted end of said third member, and tensioning means normally urging said rod in an upward direction, whereby the vertical depression of said rod causes a depression of said second member.

5. A multi-position selector switch as defined in claim 4 and further including a horizontally disposed fourth member in intimate contact with said second member and having a substantially circular cut-out portion substantially coincident with the cut-out portion of said second member.

6. A multi-position selector switch as defined in claim 5 and further including a horizontally disposed fifth member in intimate contact with the outer face of said upper wall and having a circular cut-out portion, and a series of spaced radially disposed lines in circular array about the periphery of said cut-out portion.

7. A multi-position selector switch as defined in claim 6 wherein one of said vertical slots and one of the linear arrangements of said contact ends, and one of said engraved lines is in vertical registration.

8. A multi-position selector switch as defined in claim 7 wherein said first member has a substantially circular cut-out portion.

9. A multi-position selector switch as defined in claim 8 wherein said housing and said first and fifth members consist of a transparent material.

10. A selector switch comprising a housing, a plurality of conductor means, said conductor means terminating at one end in substantially identical thin elongated contacts, second means in said housing supporting said conductor means whereby said contacts are parallel to each other and spaced arcuately and terminate substantially in a common plane, third means mounted in said housing for rotation about the axis defined by said arcuately spaced contacts and for reciprocating movement along said axis, said third means including a radial arm formed with a well near its free end at a distance from said axis corresponding to the radial distance of said arcuately spaced contacts from said axis, mercury in the well, said third means being adapted to be positioned so that said mercury envelops a selected one of said contacts.

11. A selector switch as defined in claim 10 further including indexing means, said indexing means including a member formed with a circular cut-out secured to said housing whereby the cut-out is coaxial with said third means, said member being formed with a plurality of arcuately spaced longitudinal slots in the boundary of the cut-out, one slot for each of said contacts and in alignment therewith, a spring-biased reciprocable finger at the end of said arm for registration with said slots, said slots being of such length that said third means is restrained against rotation while said well is in registration with one of said contacts, the ends of said slots remote from said contacts terminating in a circular path for said finger whereby when said well is not in registration with a contact said finger engages said circular path and said third means is rotatable.

References Cited in the file of this patent

UNITED STATES PATENTS 1,399,134   Lothrop _____ Dec. 6, 1921